(12) United States Patent
Kim et al.

(10) Patent No.: US 9,298,613 B2
(45) Date of Patent: Mar. 29, 2016

(54) INTEGRATED CIRCUIT FOR COMPUTING TARGET ENTRY ADDRESS OF BUFFER DESCRIPTOR BASED ON DATA BLOCK OFFSET, METHOD OF OPERATING SAME, AND SYSTEM INCLUDING SAME

(71) Applicant: SAMSUNG ELECTRONICS CO., LTD., Suwon-si (KR)

(72) Inventors: Seong Woon Kim, Suwon-si (KR); Kwan Ho Kim, Suwon-si (KR); Seok Min Kim, Suwon-si (KR); Tae Sun Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/144,682

(22) Filed: Dec. 31, 2013

(65) Prior Publication Data

US 2014/0244908 A1    Aug. 28, 2014

(30) Foreign Application Priority Data

Feb. 28, 2013 (KR) .................. 10-2013-0022168

(51) Int. Cl.
  *G06F 13/12*  (2006.01)
  *G06F 13/38*  (2006.01)
  *G06F 12/06*  (2006.01)
  *G06F 12/02*  (2006.01)

(52) U.S. Cl.
  CPC .......... *G06F 12/06* (2013.01); *G06F 12/0292* (2013.01)

(58) Field of Classification Search
  None
  See application file for complete search history.

(56) References Cited

U.S. PATENT DOCUMENTS

| | | | |
|---|---|---|---|
| 6,324,599 B1 * | 11/2001 | Zhou et al. | 710/26 |
| 6,868,458 B2 | 3/2005 | Kim | |
| 7,012,926 B2 * | 3/2006 | Weng et al. | 370/412 |
| 7,307,998 B1 | 12/2007 | Wang et al. | |
| 7,343,434 B2 | 3/2008 | Kapoor et al. | |
| 7,496,699 B2 * | 2/2009 | Pope | G06F 13/28 710/22 |
| 7,577,782 B2 | 8/2009 | Lym et al. | |
| 7,636,368 B2 | 12/2009 | Jang et al. | |
| 7,660,908 B2 | 2/2010 | Haselhorst et al. | |
| 7,970,262 B2 | 6/2011 | Savekar et al. | |
| 8,161,197 B2 | 4/2012 | McDaniel et al. | |
| 8,255,663 B2 | 8/2012 | Cho et al. | |
| 2003/0056055 A1 * | 3/2003 | Hooper | G06F 12/023 711/104 |
| 2005/0108446 A1 * | 5/2005 | Inogai | 710/20 |
| 2008/0240111 A1 * | 10/2008 | Gadelrab | H04L 49/90 370/395.7 |
| 2011/0252211 A1 * | 10/2011 | Moudgill et al. | 711/165 |

FOREIGN PATENT DOCUMENTS

KR    2000-0026337 A    5/2000
KR    10-0661519 B1    12/2006

* cited by examiner

*Primary Examiner* — Elias Mamo
(74) *Attorney, Agent, or Firm* — Sughrue Mion, PLLC

(57) ABSTRACT

A method of operating an integrated circuit is provided. The method includes receiving a data block offset from a second storage device, obtaining a target entry address using the data block offset, and reading an entry among a plurality of entries comprised in a buffer descriptor stored in a first storage device based on the target entry address. The method also includes reading data from a data buffer among a plurality of data buffers included in the first storage device using a physical address included in the entry and transmitting the data to the second storage device.

20 Claims, 12 Drawing Sheets

FIG. 4

| PACKETi | OFFSETi | INDEX | ESA | PA | DATA |
|---|---|---|---|---|---|
| 0 | 1OFF | 1 | BD+1OFFB | SA+6S | DATA2 |
| 1 | 3OFF | 3 | BD+3OFFB | SA+9S | DATA4 |
| 2 | 5OFF | 5 | BD+5OFFB | SA+10S | DATA6 |
| 3 | 7OFF | 7 | BD+7OFFB | SA+8S | DATA8 |
| 4 | 0 | 0 | BD | SA+3S | DATA1 |
| 5 | 2OFF | 2 | BD+2OFFB | SA+1S | DATA3 |
| 6 | 4OFF | 4 | BD+4OFFB | SA+12S | DATA5 |
| 7 | 6OFF | 6 | BD+6OFFB | SA+13S | DATA7 |

FIG. 8

| PACKETi | OFFSETi | INDEX | NoI | ESA | PA | DATA |
|---|---|---|---|---|---|---|
| 0 | 1OFF | 1 | 2 | BD+1OFFB | SA+6S | DATA2 |
| | | | | BD+2OFFB | SA+1S | DATA3 |
| 1 | 3OFF | 3 | 4 | BD+3OFFB | SA+9S | DATA4 |
| | | | | BD+4OFFB | SA+12S | DATA5 |
| | | | | BD+5OFFB | SA+10S | DATA6 |
| | | | | BD+6OFFB | SA+13S | DATA7 |
| 2 | 0 | 0 | 1 | BD | SA+3S | DATA1 |
| 3 | 7OFF | 7 | 1 | BD+7OFFB | SA+8S | DATA8 |

US 9,298,613 B2

INTEGRATED CIRCUIT FOR COMPUTING TARGET ENTRY ADDRESS OF BUFFER DESCRIPTOR BASED ON DATA BLOCK OFFSET, METHOD OF OPERATING SAME, AND SYSTEM INCLUDING SAME

CROSS-REFERENCE TO RELATED APPLICATIONS

This application claims priority from Korean Patent Application No. 10-2013-0022168 filed on Feb. 28, 2013, the disclosure of which is incorporated herein in its entirety by reference.

BACKGROUND

Methods and apparatuses consistent with exemplary embodiments of the inventive concept relate to an integrated circuit, and more particularly, to an integrated circuit for calculating a target entry address of one of a plurality of entries of a buffer descriptor based on a data block offset.

A flash memory device performs a program operation and a read operation in units of a predetermined size, e.g., in units of blocks. A buffer descriptor is used to map addresses necessary for data input/output of a plurality of memory devices. A controller that controls the data input/output of the memory devices maps necessary addresses using buffer descriptors and accesses an area of a memory device corresponding to an address obtained as the mapping result.

SUMMARY

According to an aspect of an exemplary embodiment, there is provided a method of operating an integrated circuit. The method includes receiving a data block offset from a second storage device, obtaining a target entry address using the data block offset, and reading an entry among a plurality of entries comprised in a buffer descriptor stored in a first storage device based on the target entry address.

The method may further include reading data from a data buffer among a plurality of data buffers included in the first storage device using a physical address included in the entry and transmitting the data to the second storage device.

The method may further include setting values, each of which indicates a size of a data buffer and is included in one of the entries, to be the same using a register. Alternatively, the method may further include receiving read data together with the data block offset and writing the read data to a data buffer among a plurality of data buffers included in the first storage device using a physical address included in the entry.

The obtaining the target entry address may include calculating an integer quotient of the data block offset divided by a data buffer size and calculating the target entry address using $ESA=BD+Q\times ES$, where ESA is the target entry address, BD is a start address of the buffer descriptor, Q is the integer quotient, and the ES is a size of each of the entries.

The method may further include receiving a data size together with the data block offset, calculating an adjacent entry address of the target entry address based on the target entry address and a ratio of the data size to a size of a data buffer, and reading data from a data buffer among a plurality of data buffers included in the first storage device based on a physical address included in the entry read based on the target entry address and transmitting the data to the second storage device while reading an adjacent entry based on the adjacent entry address.

The method may further include receiving a data size and read data together with the data block offset, calculating an adjacent entry address of the target entry address based on the target entry address and a ratio of the data size to a size of a data buffer, and writing the read data to a data buffer among a plurality of data buffers included in the first storage device based on a physical address included in the entry read based on the target entry address while reading an adjacent entry based on the adjacent entry address.

According to an aspect of another exemplary embodiment, there is provided an integrated circuit including a control logic circuit configured to obtain a target entry address using a data block offset received from a second storage device and a first direct memory access (DMA) controller configured to read an entry among a plurality of entries included in a buffer descriptor stored in a first storage device based on the target entry address.

The first DMA controller may access a data buffer among a plurality of data buffers included in the first storage device using a physical address included in the entry to perform a write operation or a read operation.

The integrated circuit may further include a second DMA controller configured to read data from a data buffer among a plurality of data buffers included in the first storage device using a physical address included in the entry and to transmit the data to the second storage device.

Alternatively, the integrated circuit may further include a second DMA controller configured to write read data to a data buffer among a plurality of data buffers included in the first storage device using a physical address included in the entry when the read data is received together with the data block offset.

The integrated circuit may be a universal flash storage (UFS) host controller interface defined in JEDEC JESD223. The buffer descriptor may be a physical region description table (PRDT) defined in JEDEC JESD223.

BRIEF DESCRIPTION OF THE DRAWINGS

The above and other aspects will become more apparent by describing in detail exemplary embodiments with reference to the attached drawings, in which:

FIG. 4 is a diagram of a data table for explaining the operation of an electronic system performing the data write operation illustrated in FIG. 3, according to an exemplary embodiment;

FIG. 8 is a diagram of a data table for explaining the operation of an electronic system performing the data write operation illustrated in FIG. 7, according to an exemplary embodiment;

DETAILED DESCRIPTION OF THE EXEMPLARY EMBODIMENTS

Figure 1:
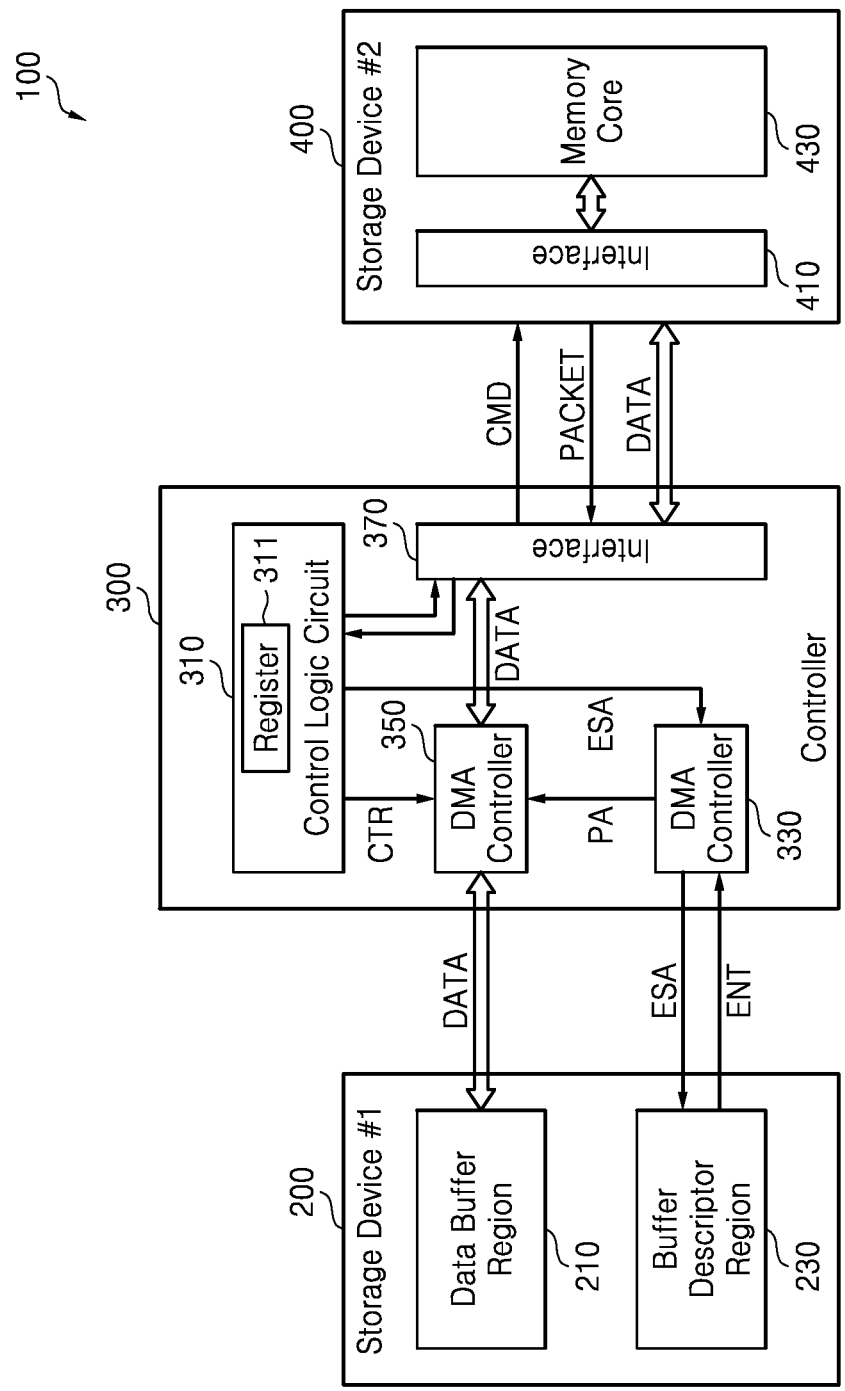
FIG. 1 is a block diagram of an electronic system according to an exemplary embodiment.

The inventive concept now will be described more fully hereinafter with reference to the accompanying drawings, in which exemplary embodiments are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements and/or components, but do not preclude the presence or addition of one or more other features, regions, integers, steps, operations, elements, components and/or groups thereof.

Unless otherwise defined, all terms (including technical and scientific terms) used herein have the same meaning as commonly understood by one of ordinary skill in the art to which the inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of an electronic system 100 according to an exemplary embodiment. The electronic system 100 includes a first storage device 200, a controller 300 and a second storage device 400. The electronic system 100 may be implemented as a personal computer (PC), a data server, a portable electronic system or another electronic system.

The portable electronic system that may be called mobile equipment may be implemented as a laptop computer, a mobile telephone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device or an e-book. The electronic system may be implemented as a digital television (TV) or an internet protocol TV (IPTV).

The first storage device 200 includes a data buffer region 210 including a plurality of data buffers and a buffer descriptor region 230 including a plurality of entries. The first storage device 200 may also include an access control circuit (not shown) that reads data from the regions 210 and 230 or writes data to the regions 210 and 230.

The first storage device 200 may be implemented by a volatile memory device or a non-volatile memory device. The volatile memory device may be implemented using dynamic random access memory (DRAM), static RAM (SRAM), thyristor RAM (T-RAM), zero capacitor RAM (Z-RAM) or twin transistor RAM (TTRAM).

The non-volatile memory device may be implemented using electrically erasable programmable read-only memory (EEPROM), flash memory, magnetic RAM (MRAM), spin-transfer torque MRAM, conductive bridging RAM (CBRAM), ferroelectric RAM (FeRAM), phase-change RAM (PRAM), resistive RAM (RRAM), nanotube RRAM, polymer RAM (PoRAM), nano floating gate memory (NFGM), holographic memory, molecular electronic memory device or insulator resistance change memory.

Figure 12:
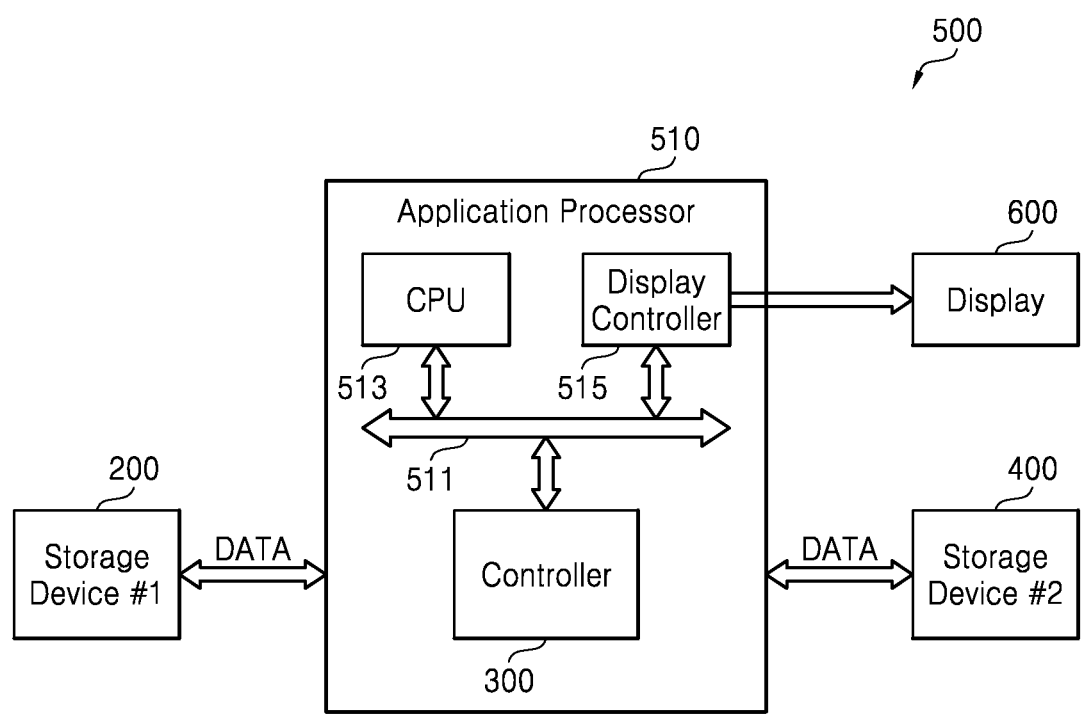
FIG. 12 is a block diagram of an electronic system according to an exemplary embodiment.

The controller 300 may control data transmitted between the first storage device 200 and the second storage device 400. The controller 300 may be implemented by an integrated circuit or a system on chip (SoC). As shown in FIG. 12, the controller 300 may be implemented as a part of an application processor.

The first storage device 200 and the controller 300 may be implemented together in a single integrated circuit or a single SoC. At this time, the first storage device 200 may be implemented using SRAM.

The controller 300 may include a control logic circuit 310, a first direct memory access (DMA) controller 330, a second DMA controller 350 and a first interface 370. The control logic circuit 310 may calculate a target entry address ESA of a target entry included in a buffer descriptor using a data block offset included in a packet output from the second storage device 400. The control logic circuit 310 may control the operations of the first DMA controller 330, the second DMA controller 350 and the first interface 370.

The first DMA controller 330 may read an entry ENT among a plurality of entries included in the buffer descriptor stored in the buffer descriptor region 230 of the first storage device 200 based on the target entry address ESA, and may transmit the entry ENT or a physical address PA included in the entry ENT to the second DMA controller 350. The first DMA controller 330 reads only the entry ENT included in the buffer descriptor stored in the buffer descriptor region 230 instead of reading the entire buffer descriptor.

During a data write operation, in response to a control signal CTR of the control logic circuit 310, the second DMA controller 350 may read part or all of data stored in one of the data buffers included in the data buffer region 210 of the first storage device 200 using the physical address PA included in the entry ENT, and transmit the data to the second storage device 400 through the first interface 370.

During a data read operation, in response to the control signal CTR of the control logic circuit 310, the second DMA controller 350 may write data output from the second storage device 400 to the part or all of one of the data buffers included in the data buffer region 210 of the first storage device 200 using the physical address PA included in the entry ENT. At this time, the packet from the second storage device 400 may include a data block offset and the data.

In other embodiments, the first DMA controller 330 may have the functions of the second DMA controller 350. At this time, the first DMA controller 330 may access one of the data buffers included in the data buffer region 210 of the first storage device 200 to perform the data write operation or the data read operation using the physical address PA included in the entry ENT.

The second storage device 400 may be implemented by a flash-based storage device that inputs and outputs data in units of a predetermined size, e.g., in units of blocks. The flash-based storage device may be a solid state drive (SSD), a universal serial bus (USB) flash drive, a universal flash storage (UFS), a secure digital (SD) card, a multimedia card (MMC) or an embedded MMC (eMMC).

When the second storage device 400 is a UFS, the controller 300 may be a UFS host controller interface defined in the standard JEDEC JESD223, the buffer descriptor included in the buffer descriptor region 230 may be a physical region description table (PRDT) in JEDEC JESD223, and the packet may be a UFS protocol information unit (UPIU). The UFS host controller interface standard JEDEC JESD223 is incorporated herein by reference.

Figure 2:
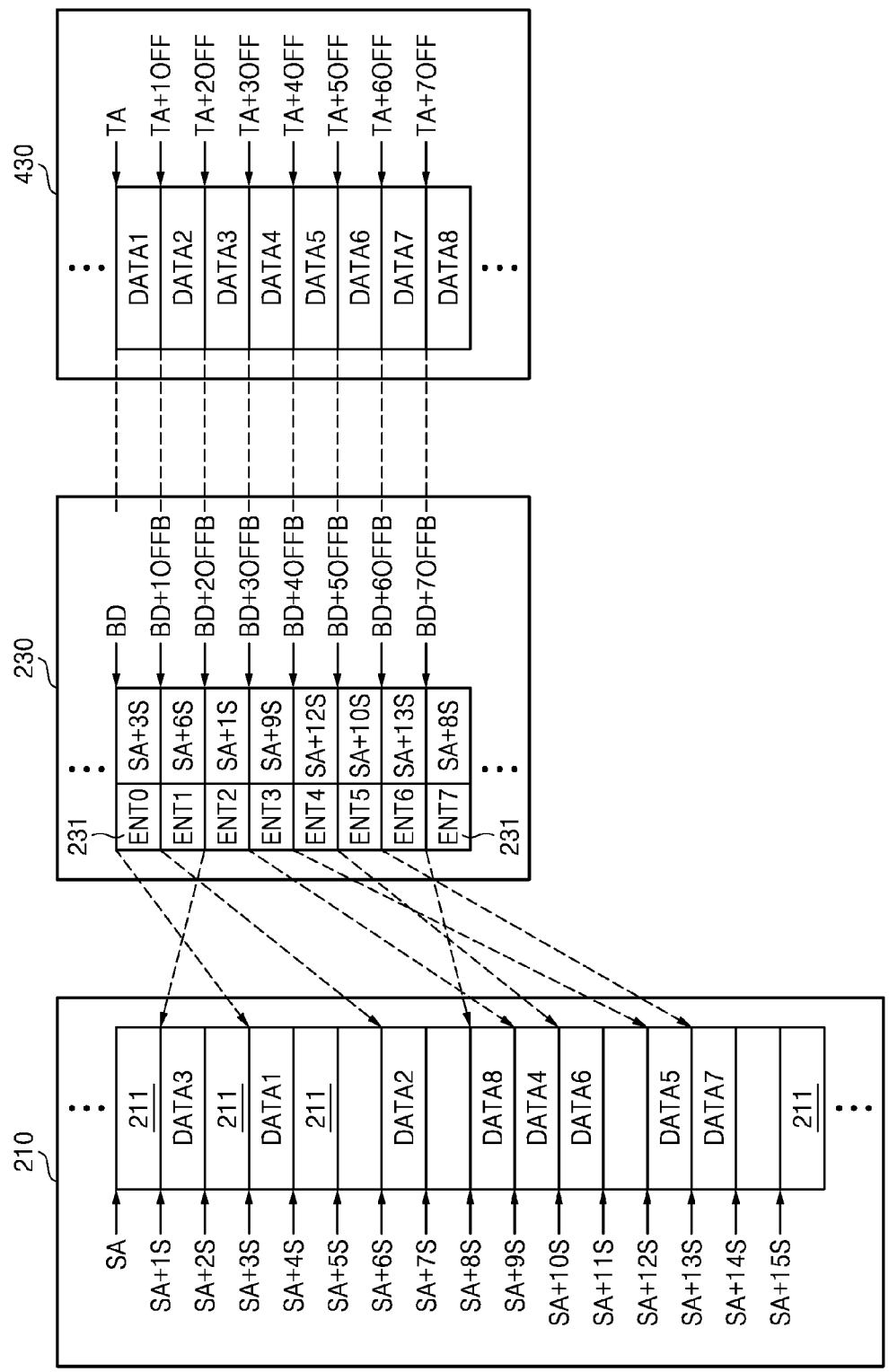
FIG. 2 is a diagram of a memory map of an electronic system including a data buffer region, a buffer descriptor region, and a memory core illustrated in FIG. 1, according to an exemplary embodiment.

FIG. 2 is a diagram of a memory map of an electronic system 100A including the data buffer region 210, the buffer descriptor region 230, and a memory core 430 illustrated in FIG. 1 according to an exemplary embodiment. The data buffer region 210 includes a plurality of data buffers 211. The data buffers may be memory regions storing data.

The buffer descriptor region 230 includes a plurality of entries 231. The entries 231 may have the same size. The buffer descriptor region 230 may include information about mapping between a data block in the second storage device 400 and a data buffer 211 in the first storage device 200. The information may be stored in the entries 231 of the buffer descriptor region 230.

Each of the entries 231 includes a physical address, e.g., a start address, of one of the data buffers 211. According to an exemplary embodiment, each entry 231 may include a physical address of a data buffer 211 and a value indicating a size of the data buffer 211. The value may be determined based on information included in a register 311 included in the control logic circuit 310.

The memory core 430 may include a plurality of memory regions, i.e., blocks. A block of data may be stored in each of the blocks.

Figure 3:
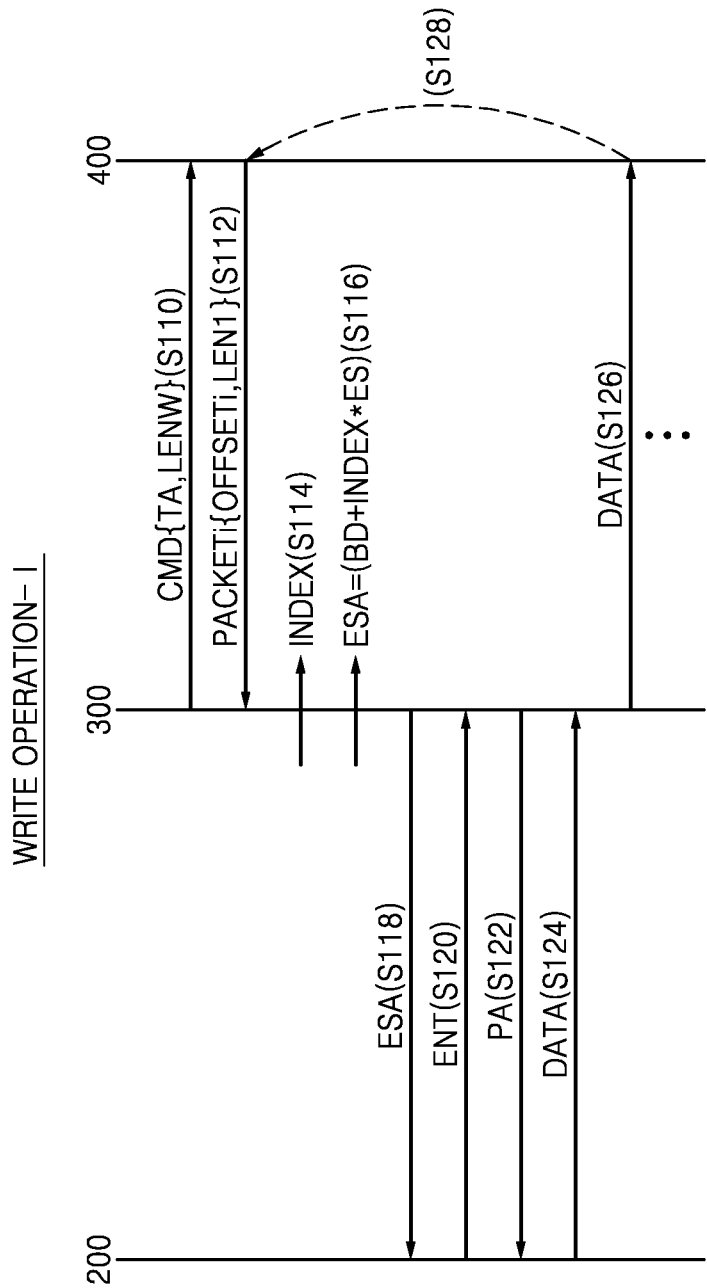
FIG. 3 is a diagram of a data flow in a data write operation according to an exemplary embodiment.

FIG. 3 is a diagram of a data flow in a data write operation according to an exemplary embodiment. FIG. 4 is a diagram of a data table for explaining the operation of an electronic system performing the data write operation illustrated in FIG. 3, according to an exemplary embodiment.

The write operation will be described with reference to FIGS. 1 through 4. It is assumed that a target start address TA of the second storage device 400 is 5000, one data block offset OFF, corresponding to a size of one data block, is 128, a buffer descriptor start address BD is 9000, an entry size OFFB is 4, a data buffer region start address SA is 1000, and a data buffer size S is 128. Here, the unit of each number is not considered.

The controller 300, more specifically the control logic circuit 310, transmits a command CMD including the target start address TA of 5000 and a data size LENW to a second interface 410 included in the second storage device 400 through the first interface 370 in operation S110. The data size LENW indicates a size of data to be written to the memory core 430.

The second storage device 400, more specifically the second interface 410, may determine the number of packets PACKETi to be transmitted and/or a transmission sequence of data according to a state of the memory core 430.

It is assumed that the second interface 410 write data DATA output from the controller 300 to the memory core 430 according to the data table illustrated in FIG. 4. The second storage device 400 transmits a packet PACKET0 including a data block offset OFFSET0 (=1OFF=128) and a data size LEN1 (=128) to the controller 300 in operation S112.

The control logic circuit 310 calculates an index of 1 based on the data buffer size S (=128) and a data block offset OFFSETi of 128 in operation S114. In other words, the index is the integer quotient (=1) of the data block offset OFFSETi (=128) divided by the data buffer size (=128). For instance, when the data block offset OFFSETi is 128 and the data buffer size S is 128, an integer quotient is 1. The control logic circuit 310 calculates the target entry address ESA in operation S116 using Equation 1:

$$ESA=BD+\text{INDEX}\times ES, \quad (1)$$

where ES is the size of each entry 231.

The target entry address ESA (=BD+1OFFB) calculated using Equation 1 is 9004.

The control logic circuit 310 outputs the target entry address ESA (=BD+1OFFB=9004) to the first DMA controller 330. The first DMA controller 330 transmits the target entry address ESA (=BD+1OFFB=9004) to the first storage device 200 in operation S118. The first storage device 200 transmits an entry ENT1 corresponding to the target entry address ESA (=BD+1OFFB=9004) to the controller 300 in operation S120. In other words, the first DMA controller 330 reads the entry ENT1 included in the buffer descriptor region 230 using the target entry address ESA (=BD+1OFFB=9004) in operations S118 and S120.

The first DMA controller 330 transmits the physical address PA (=SA+6S) included in the entry ENT1 to the second DMA controller 350. The second DMA controller 350 transmits the physical address PA (=SA+6S) to the first storage device 200 in operation S122.

The first storage device 200 transmits second data DATA2 stored in a data buffer 211 corresponding to the physical address PA (=SA+6S) to the controller 300 in operation S124. In other words, the second DMA controller 350 reads the second data DATA2 from the data buffer 211 corresponding to the physical address PA (=SA+6S) in operations S122 and S124. The second DMA controller 350 transmits the second data DATA2 to the second interface 410 through the first interface 370 in operation S126. The second interface 410 writes the second data DATA2 to a block corresponding to an address TA+1OFF.

Continuously, the second storage device 400 transmits a packet PACKET1 including a data block offset OFFSET1 (=3OFF=3×128) and the data size LEN1 (=128) to the controller 300 in operations S128 and S112.

The control logic circuit 310 calculates an index of 3 based on the data buffer size S (=128) and the data block offset OFFSETi (=3×128) in operation S114. The control logic circuit 310 calculates the target entry address ESA (=BD+3OFFB=9000+3×4=9012) using Equation 1 in operation S116. The control logic circuit 310 outputs the target entry address ESA (=BD+3OFFB=9012) to the first DMA controller 330.

The first DMA controller 330 reads an entry ENT3 included in the buffer descriptor region 230 using the target entry address ESA (=BD+3OFFB=9012) in operations S118 and S120. The first DMA controller 330 transmits the physical address PA (=SA+9S) included in the entry ENT3 to the second DMA controller 350.

The second DMA controller 350 reads fourth data DATA4 from a data buffer 211 corresponding to the physical address PA (=SA+9S) in operations S122 and S124 and transmits the fourth data DATA4 to the second interface 410 through the first interface 370 in operation S126. The second interface 410 writes the fourth data DATA4 to a block corresponding to an address TA+3OFF.

While the second DMA controller 350 is reading the second data DATA2, the first DMA controller 330 may read the entry ENT3. As a result, performance of the controller 300 is increased.

Continuously, the second storage device 400 transmits a packet PACKET2 including a data block offset OFFSET2 (=5OFF=5×128) and the data size LEN1 (=128) to the controller 300 in operations S128 and S112. The control logic circuit 310 calculates an index of 5 based on the data buffer size S (=128) and the data block offset OFFSETi (=5×128) in operation S114. The control logic circuit 310 calculates the target entry address ESA (=BD+5OFFB=9000+5×4=9020) using Equation 1 in operation S116. The control logic circuit 310 outputs the target entry address ESA (=BD+5OFFB=9020) to the first DMA controller 330.

The first DMA controller 330 reads an entry ENT5 included in the buffer descriptor region 230 using the target entry address ESA (=BD+5OFFB=9020) in operations S118 and S120. The first DMA controller 330 transmits the physical address PA (=SA+10S) included in the entry ENT5 to the second DMA controller 350.

The second DMA controller 350 reads sixth data DATA6 from a data buffer 211 corresponding to the physical address PA (=SA+10S) in operations S122 and S124 and transmits the sixth data DATA6 to the second interface 410 through the first interface 370 in operation S126. The second interface 410 writes the sixth data DATA6 to a block corresponding to an address TA+5OFF.

Thereafter, data DATA8, DATA1, DATA3, DATA5 and DATA7 are sequentially written to respectively corresponding blocks in the memory core 430 of the second storage device 400 in operations S112 through S128.

Figure 5:
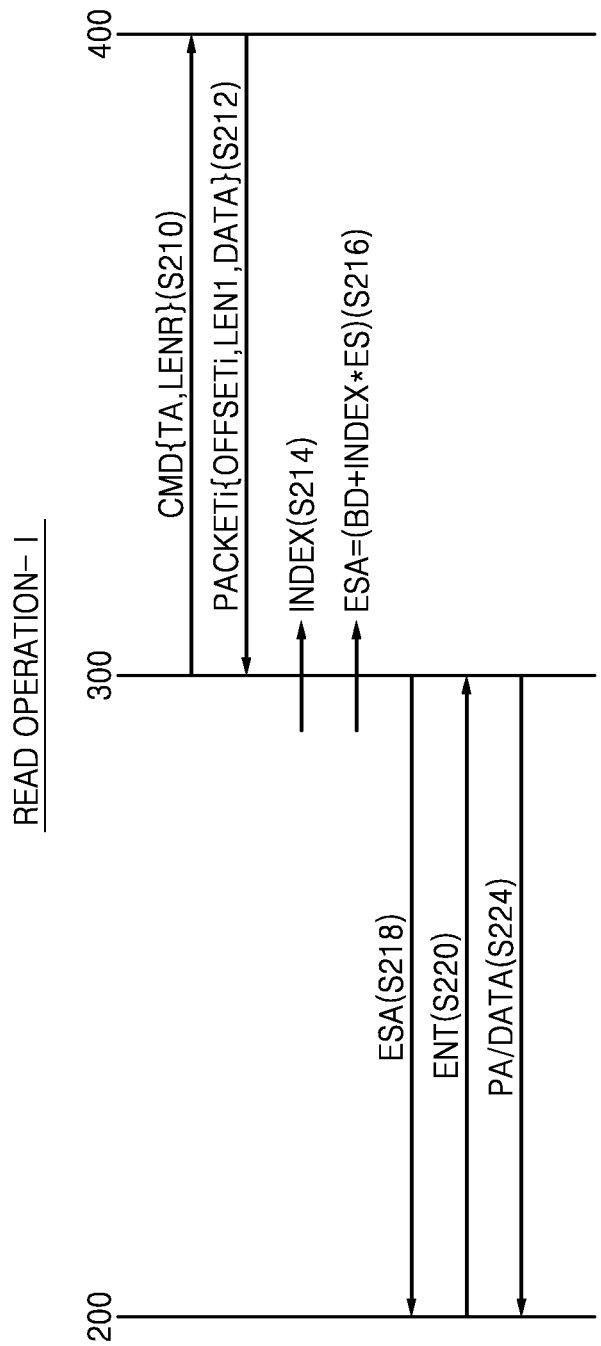
FIG. 5 is a diagram of a data flow in a data read operation according to an exemplary embodiment.

FIG. 5 is a diagram of a data flow in a data read operation according to an exemplary. The read operation will be described with reference to FIGS. 1, 2, 4 and 5.

The control logic circuit 310 of the controller 300 transmits a command CMD including a target start address TA (=5000) of the core memory 430 and a data size LENR to the second interface 410 of the second storage device 400 in operation S210. The data size LENR indicates a size of data to be read from the memory core 430.

The second storage device 400 transmits a packet PACKET0 including a data block offset OFFSET0 (=1OFF=1×128), a data size LEN1 (=128) and second data DATA2 to the controller 300 in operation S212. The control logic circuit 310 calculates an index of 1 based on the data buffer size S (=128) and the data block offset OFFSET0 (=1×128) in operation S214.

The control logic circuit 310 calculates a target entry address ESA (=BD+1OFFB=9000+1×4=9004) using Equation 1 in operation S216. The control logic circuit 310 outputs the target entry address ESA (=BD+1OFFB=9004) to the first DMA controller 330.

The first DMA controller 330 reads an entry ENT1 from the buffer descriptor region 230 using the target entry address ESA (=BD+1OFFB=9004) in operations S218 and S220. The first DMA controller 330 transmits a physical address PA (=SA+6S) included in the entry ENT1 to the second DMA controller 350.

The second DMA controller 350 writes the second data DATA2 to the data buffer 211 corresponding to the physical address PA (=SA+6S) in operation S224. Continuously, the second storage device 400 transmits a packet PACKET1 including a data block offset OFFSET1 (=3OFF=3×128), a data size LEN1 (=128) and fourth data DATA4 to the controller 300 in operation S212. The control logic circuit 310 calculates an index of 3 based on the data buffer size S (=128) and the data block offset OFFSET1 (=3×128) in operation S214.

The control logic circuit 310 calculates a target entry address ESA (=BD+3OFFB=9000+3×4=9012) using Equation 1 in operation S216. The control logic circuit 310 outputs the target entry address ESA (=BD+3OFFB=9012) to the first DMA controller 330.

The first DMA controller 330 reads an entry ENT3 from the buffer descriptor region 230 using the target entry address ESA (=BD+3OFFB=9012) in operations S218 and S220. The first DMA controller 330 transmits a physical address PA (=SA+9S) included in the entry ENT3 to the second DMA controller 350.

The second DMA controller 350 writes the fourth data DATA4 to the data buffer 211 corresponding to the physical address PA (=SA+9S) in operation S224. Thereafter, the data DATA6, DATA8, DATA1, DATA3, DATA5 and DATA7 are sequentially written to respectively corresponding data buffers 211 in the data buffer region 210 of the first storage device 200 in operations 212 through S224.

Figure 6:
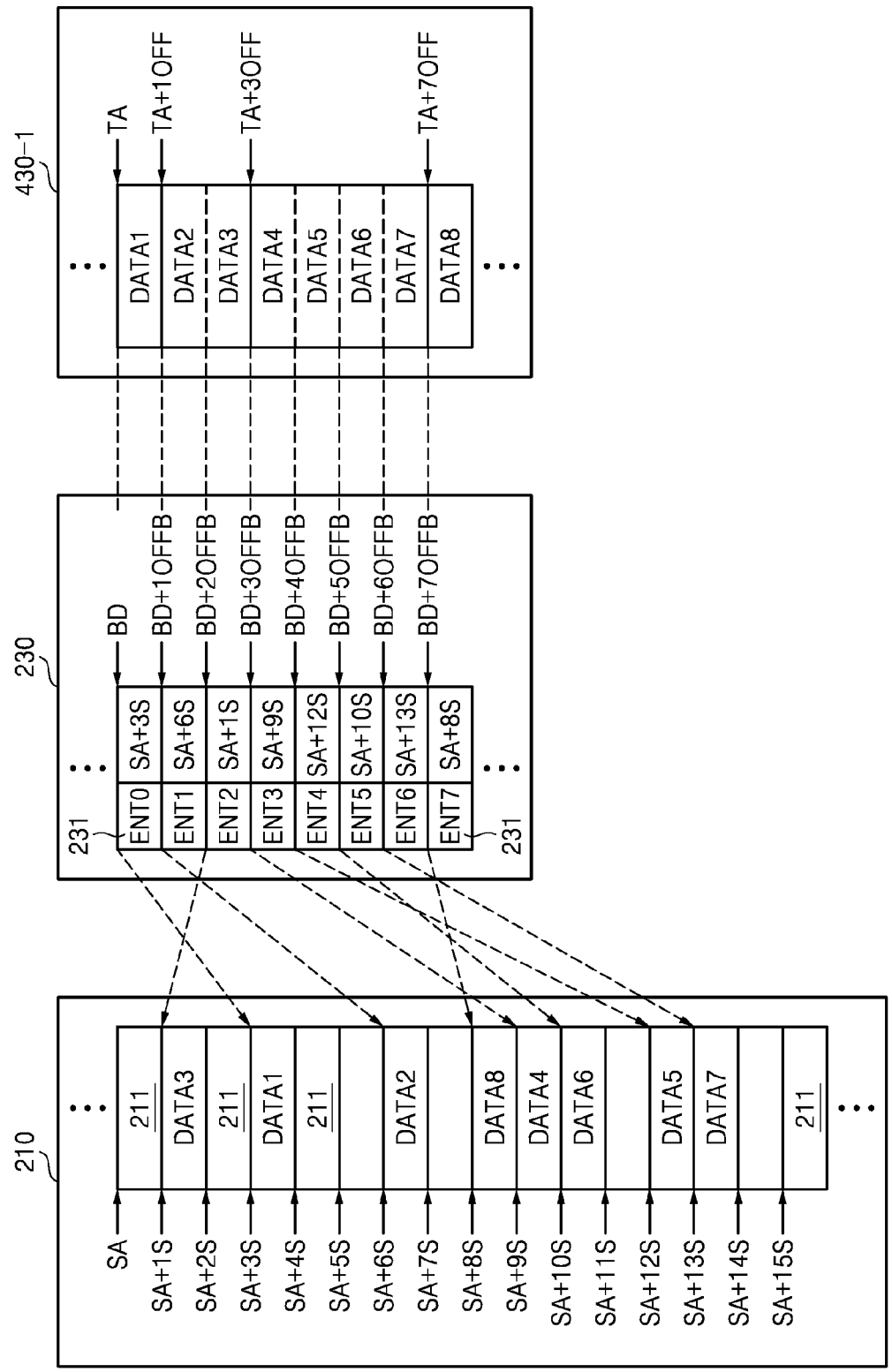
FIG. 6 is a diagram of a memory map of an electronic system including the data buffer region, the buffer descriptor region, and the memory core illustrated in FIG. 1, according to an exemplary embodiment.

FIG. 6 is a diagram of a memory map of an electronic system 100B including the data buffer region 210, the buffer descriptor region 230 and the memory core 430-1 according to an exemplary embodiment. The electronic system 100B may have the same structure of the electronic system 100A illustrated in FIG. 1. Data DATA2 and DATA3 respectively stored in data buffers 211 are sequentially processed according to a single packet and data DATA4, DATA5, DATA6 and DATA7 respectively stored in data buffers 211 are sequentially processed according to another single packet.

Figure 7:
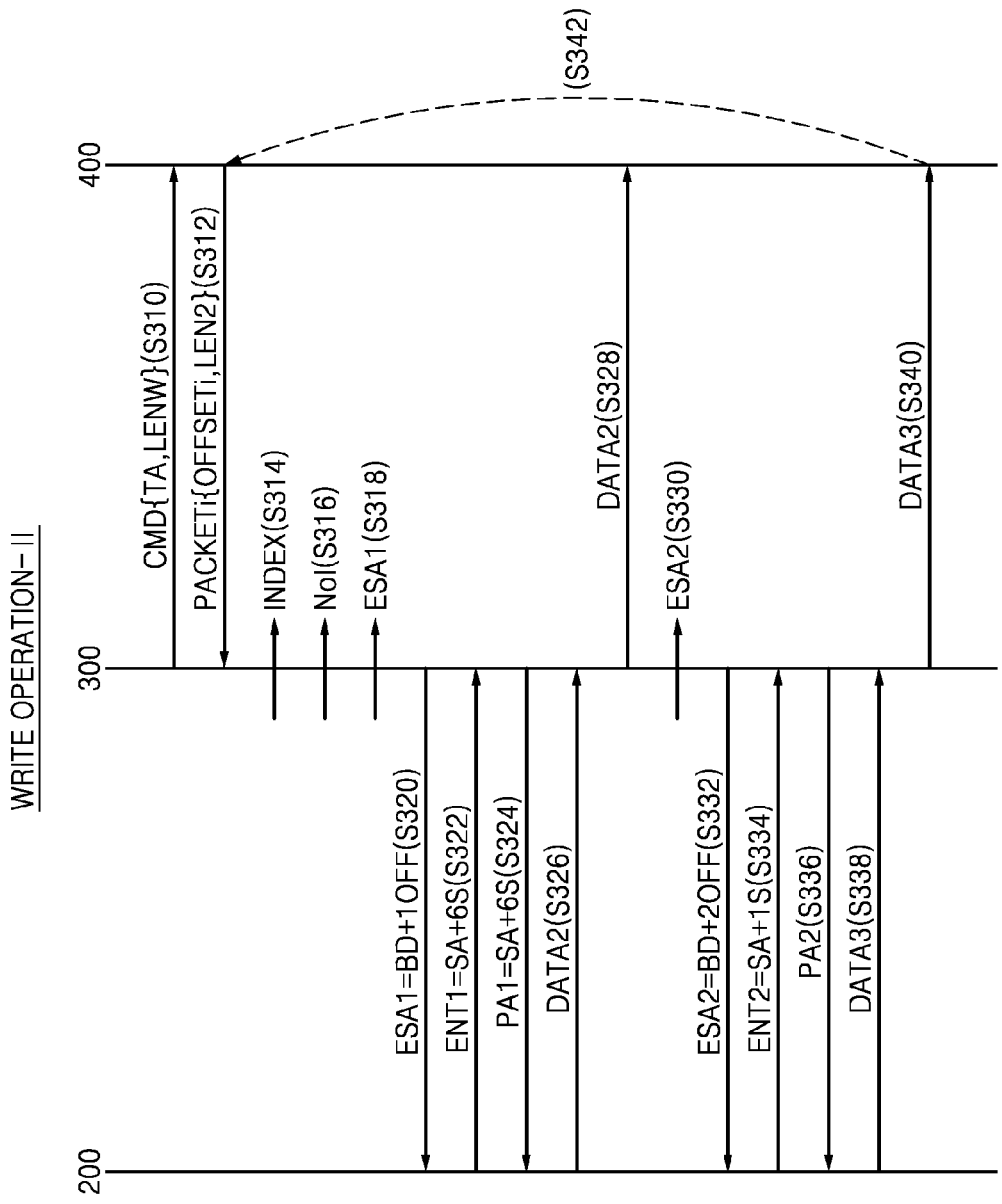
FIG. 7 is a diagram of a data flow in a data write operation according to an exemplary embodiment.

FIG. 7 is a diagram of a data flow in a data write operation according to an exemplary embodiment. FIG. 8 is a diagram of a data table for explaining an operation of an electronic system performing the data write operation illustrated in FIG. 7. The write operation performed when data having a data size LEN2 included in a packet PACKETi exists in a plurality of data buffers 211 will be described in detail with reference to FIGS. 6 through 8. The controller 300, more specifically the control logic circuit 310, transmits a command CMD including a target start address TA of 5000 and a data size LENW to the second interface 410 of the second storage device 400 in operation S310.

The second storage device 400, more specifically the second interface 410, may determine the number of packets to be transmitted, a data size LEN2 and/or a sequence of data according to a state of the memory core 430. It is assumed that the second interface 410 writes data to the memory core 430 according to the data table illustrated in FIG. 8.

The second storage device 400 transmits a packet PACKET0 including a data block offset OFFSET0

(=1OFF=128) and the data size LEN2 (=2×128) to the controller 300 in operation S312. The control logic circuit 310 calculates an index of 1 based on the data buffer size S of 128 and the data block offset OFFSET0 of 128 in operation S314. The controller 300 calculates the number of iterations, i.e., iteration number NoI based on the data block offset OFFSET0, i.e., 1OFF, the data size LEN2 (=2×128) and the data buffer size S (=128) in operation S316. The iteration number NoI may be a result of dividing the data size LEN2 by the data buffer size S (=128), i.e., 2.

The control logic circuit 310 calculates a target entry address ESA1 (=BD+1OFFB=9004) using Equation 1 in operation S318 and outputs it to the first DMA controller 330. The first DMA controller 330 reads an entry ENT1 included in the buffer descriptor region 230 using the target entry address ESA1 (=BD+1OFFB=9004) in operations S320 and S322. The first DMA controller 330 transmits a physical address PA1 (=SA+6S) included in the entry ENT1 to the second DMA controller 350.

The second DMA controller 350 reads second data DATA2 from the data buffer 211 corresponding to the physical address PA1 (=SA+6S) in operations S324 and S326 and transmits the second data DATA2 to the second interface 410 through the first interface 370 in operation S328. The second interface 410 writes the second data DATA2 to a corresponding block in the memory core 430.

The control logic circuit 310 calculates an entry address ESA2 adjacent to the target entry address ESA1. For instance, the control logic circuit 310 may calculate the adjacent entry address ESA2 based on the target entry address ESA1 and an entry size OFFB or ES.

The control logic circuit 310 outputs the adjacent entry address ESA2 (=ESA1+ES=9008) to the first DMA controller 330. The first DMA controller 330 reads an entry ENT2 from the buffer descriptor region 230 using the adjacent entry address ESA2 (=BD+2OFFB=9008) in operations S332 and S334.

The first DMA controller 330 transmits a physical address PA2 (=SA+1S) included in the entry ENT2 to the second DMA controller 350. The second DMA controller 350 reads third data DATA3 from the data buffer 211 corresponding to the physical address PA2 (=SA+1S) in operations S336 and S338 and transmits the third data DATA3 to the second interface 410 through the first interface 370 in operation S340. The second interface 410 writes a corresponding block in the memory core 430.

FIG. 7 illustrates a method of writing the data DATA2 and DATA3 to the respective blocks in the memory core 430 using one packet PACKET0. A method of writing data DATA4 through DATA7 to respective blocks in the memory core 430 using another packet PACKET1 will be described below.

The second storage device 400 transmits a packet PACKET1 including a data block offset OFFSET1 (=3OFF=3×128) and a data size LEN2 (=4×128) to the controller 300 in operation S312. The control logic circuit 310 calculates an index of 3 based on the data buffer size S of 128 and the data block offset OFFSET1 of 3×128 in operation S314.

The controller 300 calculates an iteration number NoI based on the data block offset OFFSET1, the data size LEN2 and the data buffer size S in operation S316. The iteration number NoI may be a result of dividing the data size LEN2 (=4×128) by the data buffer size S (=128), i.e., 4.

As described above, three entry addresses BD+4OFFB, BD+5OFFB and BD+6OFFB adjacent to the target entry address ESA, i.e., BD+3OFFB are sequentially calculated, and then, data DATA4, DATA5, DATA6 and DATA7 are sequentially written to respective corresponding blocks in the memory core 430 of the second storage device 400 according to physical addresses SA+9S, SA+12S, SA+10S and SA+13S, respectively, included in entries ENT3, ENT4, ENT5 and ENT6, respectively, which have been sequentially read.

Figure 9:
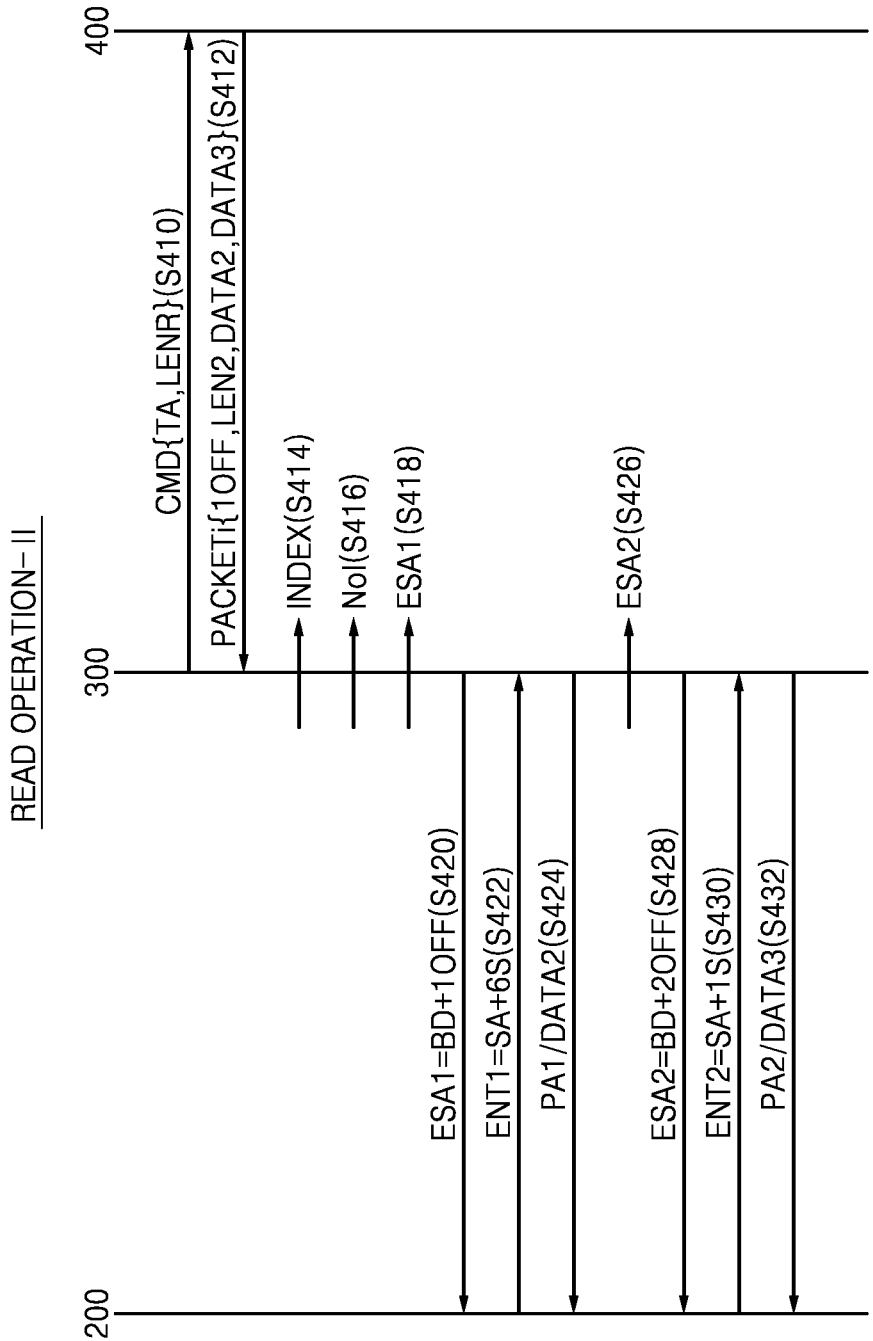
FIG. 9 is a diagram of a data flow in a data read operation according to an exemplary embodiment.

FIG. 9 is a diagram of a data flow in a data read operation according to an exemplary embodiment. The read operation performed in a case where data corresponding to a data size LEN2 included in a packet PACKETi is written to a plurality of data buffers 211 will be described in detail with reference to FIGS. 1, 6, 8 and 9.

The controller 300, more specifically the control logic circuit 310, transmits a command CMD including a target start address TA of 5000 and a data size LENR to the second interface 410 of the second storage device 400 in operation S410. The second storage device 400, more specifically the second interface 410, may determine the number of packets to be transmitted, a size of data to be read and/or a sequence of data according to a state of the memory core 430. It is assumed that the second interface 410 writes the data to the data buffer region 210 of the first storage device 200 according to the data table illustrated in FIG. 8.

The second storage device 400 transmits a packet PACKET0 including a data block offset OFFSET0 (=1OFF=128), a data size LEN2 (=2×128) and read data DATA2 and DATA3 to the controller 300 in operation S412. The control logic circuit 310 calculates an index of 1 based on the data buffer size S of 128 and the data block offset OFFSET0 of 128 in operation S414.

The control logic circuit 310 calculates an iteration number NoI based on the data block offset OFFSET0, i.e., 1OFF, the data size LEN2 (=2×128) and the data buffer size S (=128) in operation S416. For instance, the control logic circuit 310 may calculate the iteration number NoI by dividing the data size LEN2 (=2*128) by the data buffer size S (=128), that is, the iteration number NoI may be 2.

The control logic circuit 310 calculates a target entry address ESA1 (=BD+1OFFB=9004) using Equation 1 in operation S418 and outputs it to the first DMA controller 330. The first DMA controller 330 reads an entry ENT1 included in the buffer descriptor region 230 using the target entry address ESA1 (=BD+1OFFB=9004) in operations S420 and S422. The first DMA controller 330 transmits a physical address PA1 (=SA+6S) included in the entry ENT1 to the second DMA controller 350.

The second DMA controller 350 writes second data DATA2 to the data buffer 211 corresponding to the physical address PA1 (=SA+6S) in operation S424. The control logic circuit 310 calculates an entry address ESA2 adjacent to the target entry address ESA1. For instance, the control logic circuit 310 may calculate the adjacent entry address ESA2 based on the target entry address ESA1 and an entry size OFFB or ES. The control logic circuit 310 outputs the adjacent entry address ESA2 (=ESA1+ES=9008) to the first DMA controller 330.

The first DMA controller 330 reads the entry ENT2 from the buffer descriptor region 230 using the adjacent entry address ESA2 (=BD+2OFFB=9008) in operations S428 and S430. The first DMA controller 330 transmits the physical address PA2 (=SA+1S) included in the entry ENT2 to the second DMA controller 350. The second DMA controller 350 writes the third data DATA3 to the data buffer 211 corresponding to the physical address PA2 (=SA+1S) in operation S432.

FIG. 9 illustrates a method of writing the read data DATA2 and DATA3 to the respective data buffers 211 using one packet PACKET0. A method of writing data DATA4 through DATA7 to respective data buffers 211 using another packet PACKET1 will be described below.

The second storage device 400 transmits a packet PACKET1 including a data block offset OFFSET1 (=3OFF=3×128) and a data size LEN2 (=4×128) to the controller 300 in operation S412. The control logic circuit 310 calculates an index of 3 based on the data buffer size S of 128 and the data block offset OFFSET1 of 3×128 in operation S414.

Since data corresponding to the data size LEN2 included in the packet PACKET1 is written to a plurality of data buffers 211, the control logic circuit 310 calculates an iteration number NoI based on the data block offset 3OFF, the data size LEN2 (=4×128) and the data buffer size S (=128) in operation S416. For instance, the control logic circuit 310 may calculate the iteration number NoI by dividing the data size LEN2 (=4×128) by the data buffer size S (=128), that is, the NoI may be 4.

As described above, three entry addresses BD+4OFFB, BD+5OFFB and BD+6OFFB adjacent to the target entry address ESA, i.e., BD+3OFFB are sequentially calculated, and then, data DATA4, DATA5, DATA6 and DATA7 are sequentially written to respective data buffers 211 in the data buffer region 210 of the first storage device 200 using physical addresses SA+9S, SA+12S, SA+10S and SA+13S, respectively, included in entries ENT3, ENT4, ENT5 and ENT6, respectively, which have been sequentially read.

Figure 10:
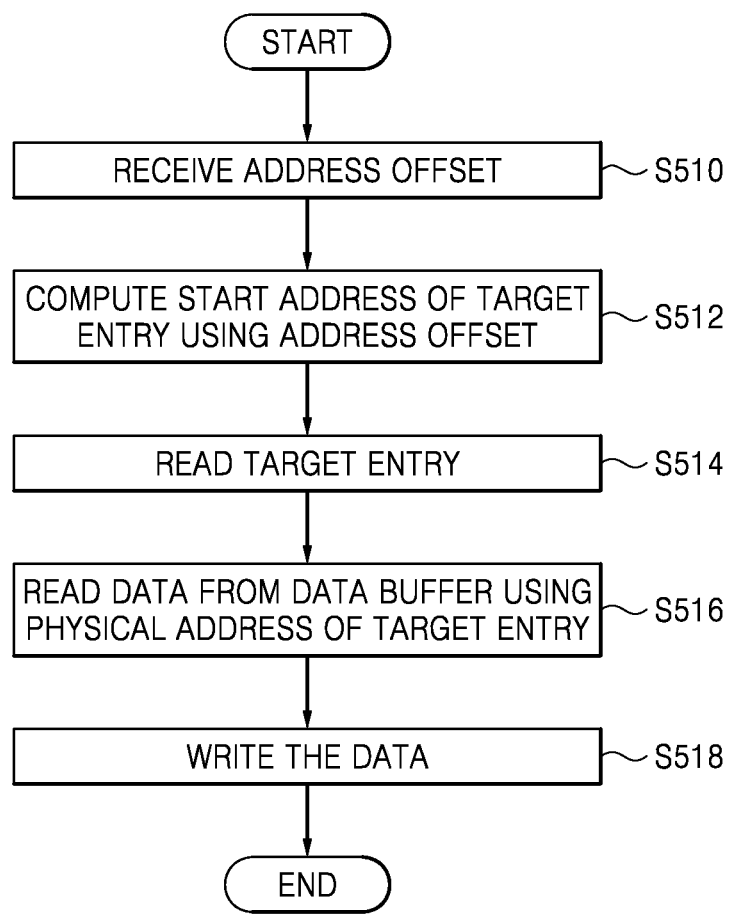
FIG. 10 is a flowchart of a data write method according to an exemplary embodiment.

FIG. 10 is a flowchart of a data write method according to an exemplary embodiment. Referring to FIGS. 1 through 4, 6 through 8 and 10, the controller 300 receives a packet PACKETi including a data block offset OFFSETi from the second storage device 400 in operation S510.

The controller 300 calculates a start address of a target entry, i.e., a target entry address ESA using the data block offset OFFSETi in operation S512. The controller 300 reads a target entry ENT corresponding to the target entry address ESA using the first DMA controller 330 in operation S514.

The controller 300 reads data from a data buffer 211 using a physical address PA included in the target entry ENT in operation S516. The controller 300 transmits the data to the second storage device 400 and the second storage device 400 writes the data to a corresponding block in the memory core 430 in operation S518.

Figure 11:
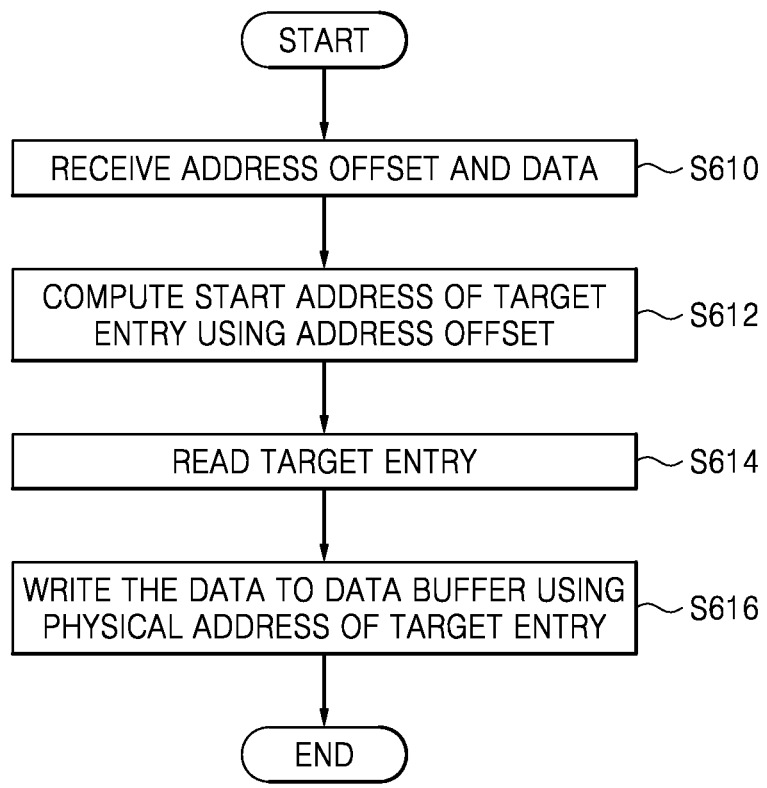
FIG. 11 is a flowchart of a data read method according to an exemplary embodiment.

FIG. 11 is a flowchart of a data read method according to an exemplary embodiment. Referring to FIGS. 1, 2, 4, 5, 6, 8, 9 and 11, the controller 300 receives a packet PACKETi including a data block offset OFFSETi and read data from the second storage device 400 in operation S610.

The controller 300 calculates a start address of a target entry, i.e., a target entry address ESA using the data block offset OFFSETi in operation S612. The controller 300 reads a target entry ENT corresponding to the target entry address ESA using the first DMA controller 330 in operation S614. The controller 300 writes the read data to a data buffer 211 using the physical address PA included in the target entry ENT in operation S616.

FIG. 12 is a block diagram of an electronic system 500 according to an according to an exemplary embodiment. Referring to FIGS. 1 through 12, the electronic system 500 includes the first storage device 200, an application processor 510, the second storage device 400 and a display 600.

The application processor 510 includes the controller 300, a central processing unit (CPU) 513 and a display controller 515. The CPU 513 controls operations of the controller 300 and the display controller 515 through a bus 511. According to the control of the display controller 515, data in the storage devices 200 and 400 may be displayed on the display 600.

As described above, according to an exemplary embodiment, an integrated circuit easily calculates a physical address of a storage device, which is required for mapping, thereby reducing resources necessary to calculate the physical address and increasing data input/output performance.

While the inventive concept has been particularly shown and described with reference to exemplary embodiments thereof, it will be understood by those of ordinary skill in the art that various changes in forms and details may be made therein without departing from the spirit and scope of the inventive concept as defined by the following claims.

What is claimed is:

1. A method of operating an integrated circuit, the method comprising:
receiving a data block offset from a second storage device;
obtaining a target entry address of a buffer descriptor stored in a first storage device, by using the data block offset; and
reading an entry, among a plurality of entries comprised in the buffer descriptor, based on the target entry address,
wherein the obtaining the target entry address comprises:
calculating an integer quotient of the data block offset divided by a data buffer size; and
calculating the target entry address using ESA=BD+Q×ES, where the ESA is the target entry address, BD is a start address of the buffer descriptor, Q is the integer quotient, and the ES is a size of each of the entries.

2. The method of claim 1, further comprising reading data from a data buffer among a plurality of data buffers comprised in the first storage device using a physical address comprised in the entry and transmitting the data to the second storage device.

3. The method of claim 2, wherein further comprising reading another entry, among the plurality of entries, corresponding to another data buffer to read another data from the other data buffer during the reading data from the data buffer.

4. The method of claim 1, further comprising setting values, each of which indicates a size of a data buffer and is comprised in one of the entries, to be the same using a register.

5. The method of claim 1, further comprising:
receiving read data together with the data block offset; and
writing the read data to a data buffer among a plurality of data buffers comprised in the first storage device using a physical address comprised in the entry.

6. The method of claim 1, wherein the first storage device is implemented within the integrated circuit.

7. The method of claim 1, further comprising:
receiving a data size together with the data block offset;
calculating an adjacent entry address of the target entry address based on the target entry address and a ratio of the data size to a size of a data buffer; and
reading data from a data buffer among a plurality of data buffers comprised in the first storage device based on a physical address comprised in the entry read based on the target entry address and transmitting the data to the second storage device while reading an adjacent entry based on the adjacent entry address.

8. The method of claim 1, further comprising:
receiving a data size and read data together with the data block offset;
calculating an adjacent entry address of the target entry address based on the target entry address and a ratio of the data size to a size of a data buffer; and
writing the read data to a data buffer among a plurality of data buffers comprised in the first storage device based on a physical address comprised in the entry read based on the target entry address while reading an adjacent entry based on the adjacent entry address.

9. A method of operating an integrated circuit, the method comprising:
receiving, from a second storage device, one data packet which comprises first information about data blocks in the second storage device and second information about data to be written to the second storage device;
calculating a number of data writing operations and a target entry address using the second information and the first information, respectively;
reading data stored in a storage, corresponding to the target entry address, in a first storage device, and writing the read data to a data block in the second storage device; and
reading another data stored in another storage, adjacent to the storage, in the first storage device, and writing the other read data to another data block in the second storage device,
wherein the reading and writing the other data is repeated without receiving, from the second storage device, an additional data packet comprising the first and second information,
wherein the first information comprises a data block offset, and
wherein the calculating the target entry address comprises,
calculating an integer quotient of the data block offset divided by a data buffer size; and
calculating the target entry address using ESA=BD+Q×ES, where the ESA is the target entry address, BD is a start address of the buffer descriptor, Q is the integer quotient, and the ES is a size of each of the entries.

10. The method of claim 9, wherein the second information comprises a size of the data to be written to the second storage device, and
wherein the number of data writing operations corresponds to the size of the data to be written to the second storage device.

11. The method of claim 10, wherein the number of data writing operations is calculated by dividing the size of the data to be written to the second storage device by a size of the storage in the first storage device.

12. An integrated circuit comprising:
a control logic circuit configured to obtain a target entry address using a data block offset received from a second storage device; and
a first direct memory access (DMA) controller configured to read an entry among a plurality of entries comprised in a buffer descriptor stored in a first storage device based on the target entry address,
wherein the control logic circuit calculates an integer quotient of the data block offset divided by a data buffer size and calculates the target entry address using ESA=BD+Q×ES, where ESA is the target entry address, BD is a start address of the buffer descriptor, Q is the integer quotient, and the ES is a size of each of the entries.

13. The integrated circuit of claim 12, wherein the first DMA controller accesses a data buffer among a plurality of data buffers comprised in the first storage device using a physical address comprised in the entry to perform one of a write operation and a read operation.

14. The integrated circuit of claim 12, further comprising a second DMA controller configured to read data from a data buffer among a plurality of data buffers comprised in the first storage device using a physical address comprised in the entry and transmit the data to the second storage device.

15. The integrated circuit of claim 12, further comprising a second DMA controller configured to write read data to a data buffer among a plurality of data buffers comprised in the first storage device using a physical address comprised in the entry when the read data is received together with the data block offset.

16. The integrated circuit of claim 12, wherein the integrated circuit is a universal flash storage (UFS) host controller interface defined in JEDEC JESD223.

17. The integrated circuit of claim 12, wherein the buffer descriptor is a physical region description table (PRDT) defined in JEDEC JESD223.

18. An application processor comprising:
the integrated circuit of claim 12; and
a controller controlling the integrated circuit.

19. The method of claim 1, each of the plurality of entries comprises a physical address, the physical address indicating a data buffer region start address and an integer multiple of the data buffer size.

20. The method of claim 12, each of the plurality of entries comprises a physical address, the physical address indicating a data buffer region start address and an integer multiple of the data buffer size.

* * * * *